(12) United States Patent
Matsumoto et al.

(10) Patent No.: US 6,548,773 B2
(45) Date of Patent: Apr. 15, 2003

(54) COLUMN MOUNTED TURN SIGNAL, WIPER-WASHER SWITCH

(75) Inventors: Tsuyoshi Matsumoto, Tokyo (JP); Yasuhiro Sato, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 09/978,560

(22) Filed: Oct. 18, 2001

(65) Prior Publication Data

US 2002/0046937 A1 Apr. 25, 2002

(30) Foreign Application Priority Data

Oct. 20, 2000 (JP) .................................. 2000-321213

(51) Int. Cl.⁷ .............................. G05D 5/36; H01H 9/00
(52) U.S. Cl. ................................................ 200/61.54
(58) Field of Search ........................... 200/61.27–61.38, 200/61.54–61.57; 307/10.1; 250/221, 229, 231.1–231.18, 551, 232, 233; 385/50, 53, 114, 125, 126; 701/41

(56) References Cited

U.S. PATENT DOCUMENTS

| | | | | |
|---|---|---|---|---|
| 4,647,736 A | * | 3/1987 | Furuhashi et al. | 200/61.27 |
| 4,672,214 A | * | 6/1987 | Takahashi et al. | 250/551 |
| 4,711,516 A | * | 12/1987 | Graber | 385/26 |
| 5,611,704 A | * | 3/1997 | Kamizono et al. | 439/15 |
| 5,847,342 A | * | 12/1998 | Uchiyama et al. | 200/61.54 |
| 6,127,638 A | * | 10/2000 | Masuda et al. | 200/61.27 |
| 6,147,416 A | * | 11/2000 | Mitsuzuka | 307/10.1 |
| 6,225,582 B1 | * | 5/2001 | Stadler et al. | 200/61.27 |
| 6,271,515 B1 | * | 8/2001 | Matsumoto | 250/239 |
| 6,330,522 B1 | * | 12/2001 | Takeuchi | 701/41 X |
| 6,403,900 B2 | * | 6/2002 | Hecht et al. | 200/61.54 |

FOREIGN PATENT DOCUMENTS

JP 60-111053 7/1985

* cited by examiner

*Primary Examiner*—J. R. Scott
(74) *Attorney, Agent, or Firm*—Rader, Fishman & Grauer PLLC

(57) ABSTRACT

A combination switch is mounted with switch bodies at recesses formed at a base and is provided with a steering sensor for detecting a steering angle of a steering wheel. The combination switch is provided with a rotor rotated along with the steering wheel. The rotor is provided with a sensor board of the steering sensor. The switch bodies are provided with a detecting portion for detecting pivotal movement of the sensor board.

13 Claims, 4 Drawing Sheets

COLUMN MOUNTED TURN SIGNAL, WIPER-WASHER SWITCH

BACKGROUND OF THE INVENTION

1. Field of the Invention

The present invention relates to a combination switch having a steering sensor for detecting rotation of a steering wheel of an automobile.

2. Description of the Related Art

Hitherto, there has been devised a constitution in which a steering sensor is installed to a combination switch as disclosed in, for example, Japanese Utility Model Laid-Open No. 111053/1985. The devised steering sensor is a sensor constituted by installing light emitting and receiving elements to a base of the combination switch and installing a sensor board to a cancel cam. The combination switch is constituted by a base installed to a steering column and a direction indicating lever mounted above the base.

Further, a combination switch in recent years, as disclosed for example in U.S. Pat. Nos. 5,847,342 and 6,271,515, is constituted by a switch mounting a rotary connector for an air bag above a base of the combination switch and mounting switch bodies of the combination switch from left and right of the base. Further, a steering sensor is installed on a lower face of the rotary connector and a circuit board constituting an electric circuit of the steering sensor, a housing and a connector for electric connection are arranged on a lower face of a stator housing of the rotary connector.

However, according to the related art steering sensor, the circuit board, the housing and the connector for electric connection are arranged at the lower face of the rotary connector and a side face portion of the base of the combination switch, and therefore, there poses a problem that numbers of circuit boards, connectors and harnesses are increased and portions surrounding the base become large-sized.

SUMMARY OF THE INVENTION

The invention is aimed to reduce a number of parts and assembling steps of a steering sensor and achieve a reduction in cost by installing a steering sensor to a switch body of a combination switch mounted to a base.

The invention has been invented in order to resolve the above-described problem of the related art technology and has the following characteristis.

(1) According to the invention, in a combination switch for an automobile mounted to a steering column, comprising a base formed with recesses on left and right sides thereof, switch bodies mounted to the recesses and a steering sensor for detecting a steering angle of a steering wheel, wherein the combination switch includes a rotor rotated along with the steering wheel, the rotor includes a sensor board of the steering sensor, and the switch bodies include a detecting portion for detecting pivotal movement of the sensor board.

(2) In the invention set forth in (1) above, the detecting portion is arranged on a face of the switch bodies on a side of a steering shaft.

(3) In the invention set forth in (1) or (2), the base is mounted with a rotary connector apparatus for electrically connecting the side of the steering wheel and a side of a vehicle body by a flexible flat cable wound in a containing space inside of a housing formed by a rotor housing and a stator housing wherein the rotor is engaged with the rotor housing via the stator housing from a lower side of the base, an upper side portion of the rotor includes an upper side shaft cylindrical portion engaged with a cylindrical portion formed on an axis core side of the rotor housing, a lower side portion of the rotor includes a lower side shaft cylindrical portion and arranged with the sensor board on a lower side of the stator housing of the lower side shat cylindrical portion and a central portion of the rotor is formed with a sliding face brought into sliding contact, with the stator housing.

(4) In the invention as set forth in any of (1), (2) and (3) above, the steering sensor is constituted by electrically connecting the detecting portion to a board included in the switch bodies of the combination switch.

(5) In the invention as set forth in (4) above, the board is mounted with electric parts constituting an electric circuit of the combination switch and parts constituting an electric circuit of the steering sensor.

DESCRIPTION OF THE PREFERRED EMBODIMENTS

Figure 1:
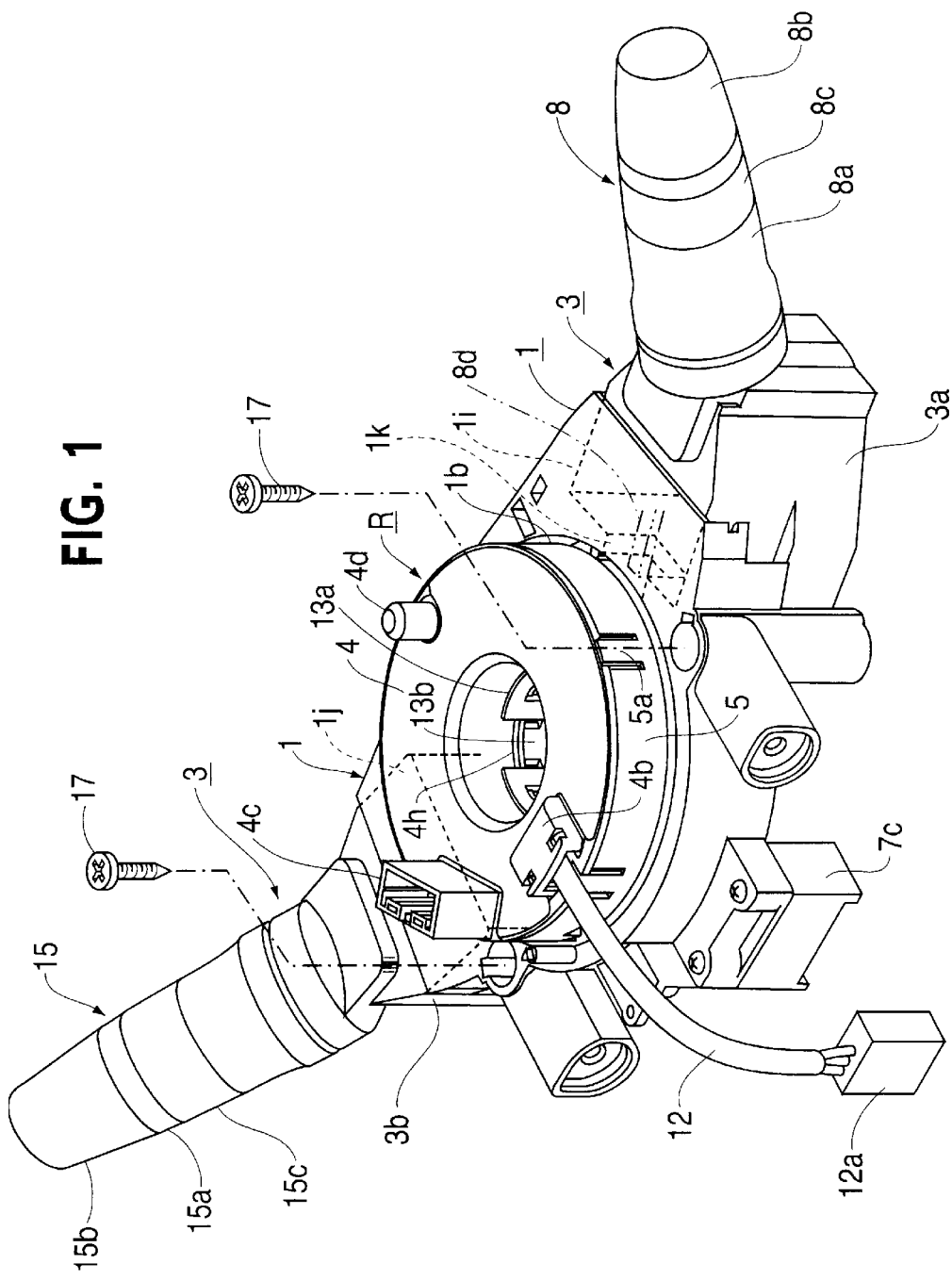
FIG. 1 is a view showing an embodiment of the invention and is a perspective view.

First, an embodiment of the invention will be described in detail with reference to FIG. 1 through FIG. 4.

A combination switch according to the invention is constituted by a combination switch 3 comprising a base 1 and switch bodies 3a and 3b, a rotary connector apparatus R installed on an upper side of the base 1 of the combination switch 3 and a steering sensor 14 in which a sensor board 14b is installed at a rotor 13 of the rotary connector apparatus R and detecting portions 14a are installed at the switch bodies 3a and 3b.

The combination switch 3 is constituted by, for example, fitting the switch body 3a of a turn signal switch 8 or the like to a right recess 1i of the base 1 and fitting the switch body 3b of a wiper washer switch 15 or the like to a left recess 1j of the base 1.

In the following, with regard to the embodiment of the invention, a detailed description will be given of an embodiment of the combination switch 3 for a right steering wheel vehicle in which a steering wheel is installed on the right side of a vehicle body. When the embodiment is used in a left steering wheel vehicle, the embodiment can be executed by making respective constituent parts symmetrical.

The turn signal switch 8 is constituted by the switch body 3a and an operating lever 8a installed to pivot the switch body 3a in the up and down direction and in the left and right direction. According to the turn signal switch 8, when the operating lever 8a is operated to pivot to left and right direction indicating positions, a cancel claw 8d is moved to inside of a rotary movement locus circle of a cancel cam 5c and a turn signal lamp is winked.

The operating lever 8a is arranged with, for example, a knob 8b of a lighting switch and a knob 8c of a fog lamp switch and is provided with functions of a passing switch and a main dimmner switch by operating the operating lever 8a in the up and down direction.

The wiper washer switch 15 is constituted by the switch body 3b and an operating lever 15a installed to the switch body 3b to pivot in the up and down direction and in the left and right direction. The operating lever 15a is arranged with, for example, a knob 15b of an intermittent volume of a wiper switch and a knob 15c of a rear wiper washer switch and is provided with functions for controlling operational speed of a wiper by operating the operating lever 15a in the front and rear direction and operating the washer switch by operating the operating lever 15a in the up and down direction.

The rotary connector apparatus R is constituted by a rotor housing 4 rotated along with the steering wheel, a side housing 5 engaged with the rotor housing 4, a rotating member comprising a rotor 13 engaged with the rotor housing 4, a fixed member of a stator housing 7 fixed to the base 1 and a flat cable 6 one end of which is fixed to a side of the stator housing 7 and other end of which is fixed to a side of the rotor housing 4.

The steering sensor 14 is for detecting a steering angle of the steering wheel, installed to the rotor 13 rotated along with the steering wheel and constituted by the sensor board 14b having slits 14c and a main body 14d installed to the switch body 3b of the combination switch 3 and having the detecting portion 14a.

A detailed explanation will be given of respective portions as follows.

Figure 2:
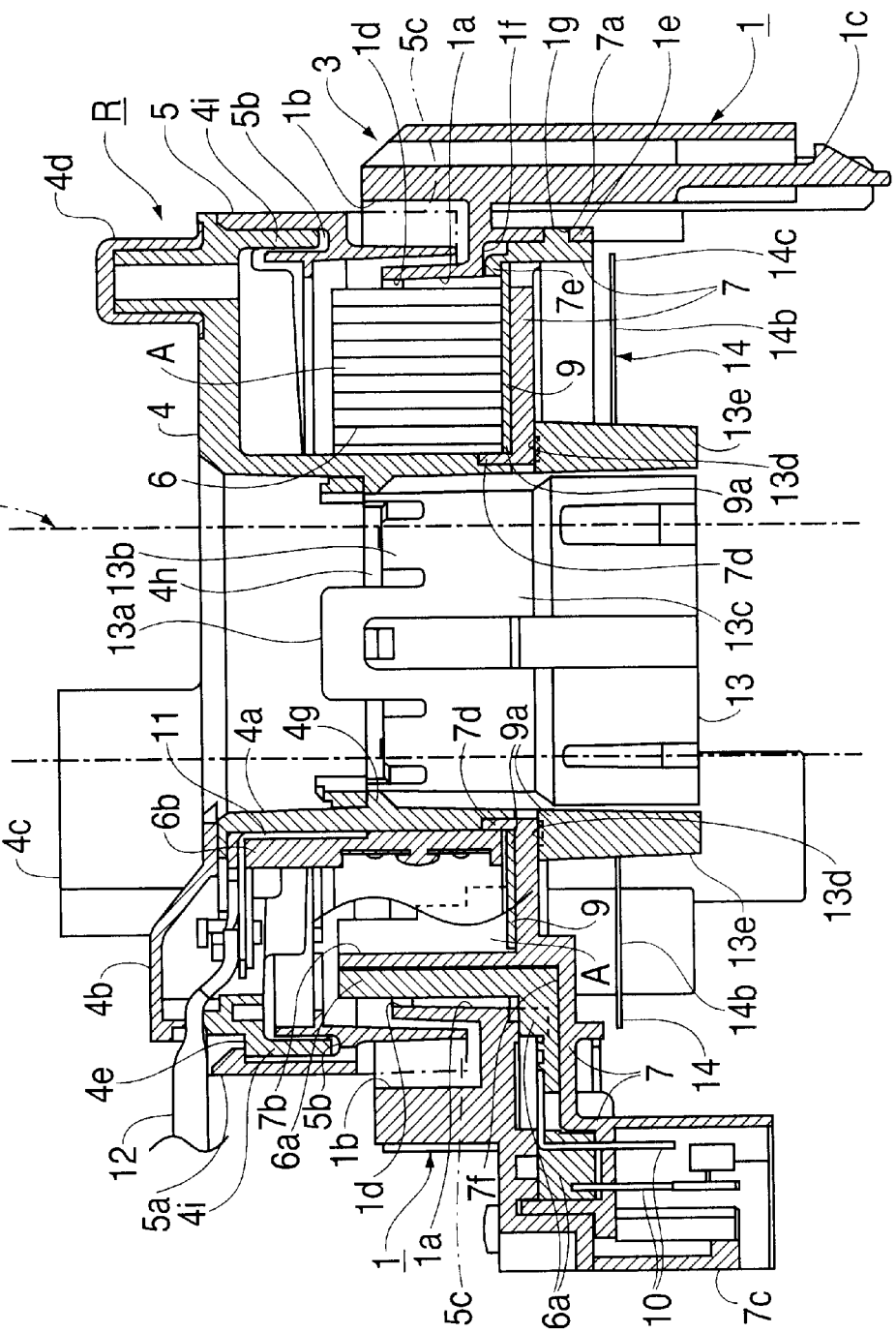
FIG. 2 is a view showing the embodiment of the invention and is a central vertical sectional view.
Figure 3:
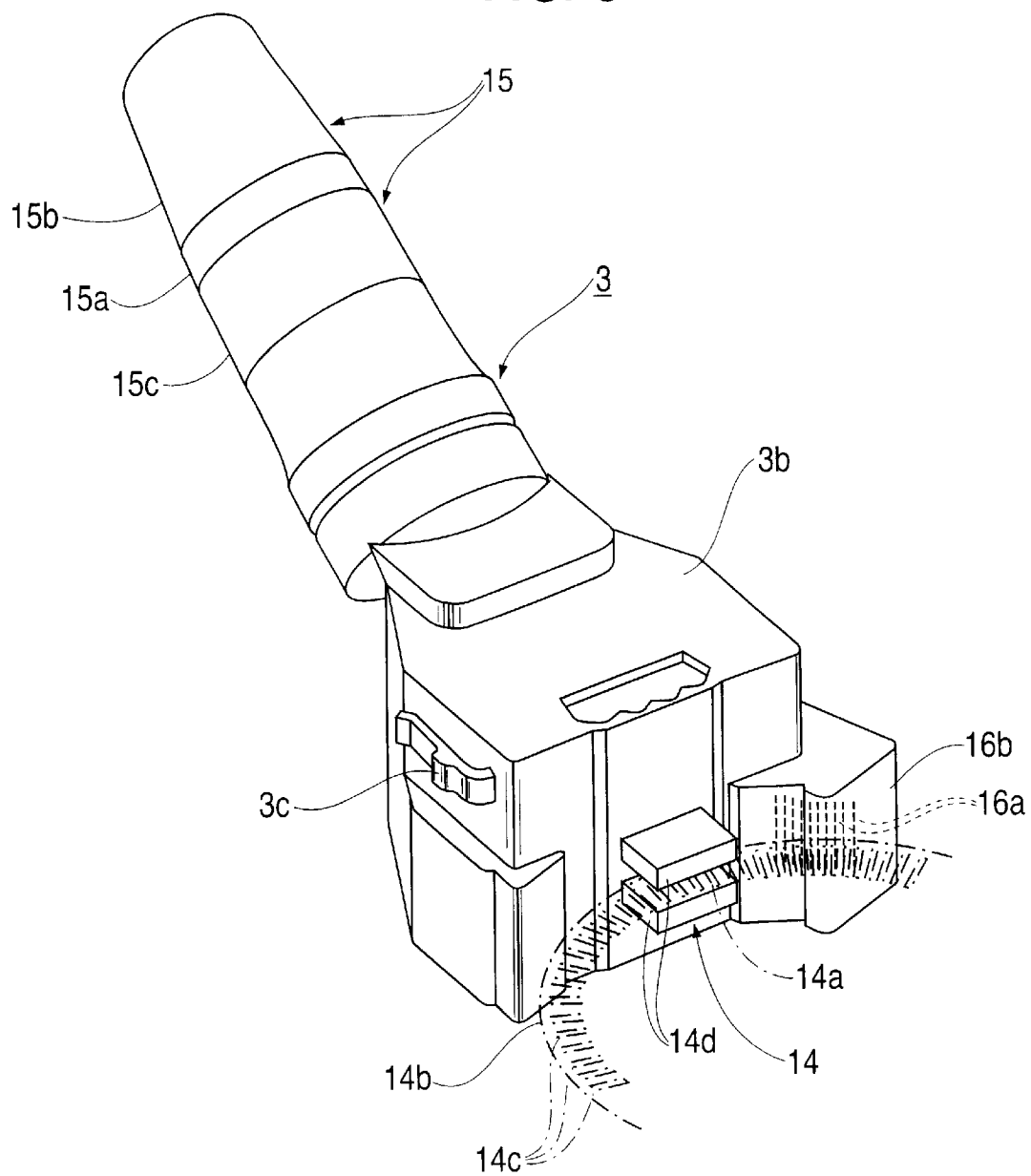
FIG. 3 is a view showing the embodiment of the invention and is a perspective view of a wiper washer switch.

The base 1 of the combination switch 3 is inserted with a steering shaft 2 at its center as shown by FIG. 1 and FIG. 2 and is fixed to a steering column (not illustrated) by screws 17 shown in FIG. 1 and locking pieces 1c. As shown by FIG. 2, the base 1 is formed with a cylindrical portion 1a at its central side and a surrounding of the cylindrical portion 1a is formed with a ring-like groove 1b pivotably inserted with a lower portion of the side housing 5 engaged with the rotor housing 4 of the rotary connector apparatus R. The base 1 is formed with the recesses 1i and 1j for fitting the switch bodies 3a and 3b at its left and right side faces.

As shown by FIG. 2, the cylindrical portion 1a is constituted by a cylindrical shape connected with an upper side ring-like wall 1d covering an outer peripheral portion of the flat cable 6 and a lower side ring-like wall 1e engaged with the stator housing 7. A stepped difference portion 1f is provided at a middle portion of the upper side ring-like wall 1d and the lower side ring-like wall 1e and the stator housing 7 is arranged on a lower side of the stepped difference portion 1f. The lower side ring-like wall 1e at a vicinity of the stepped difference portion 1f, is formed with a locked portion 1g with which a locking portion 7a in a claw-like shape formed at the stator housing 7, is engaged and by engaging the locking portion 7a to the locked portion 1g, the stator housing 7 is fitted to the base 1.

At a depth wall of the recess 1i, as shown by FIG. 1, there is formed a notched portion 1k communicating with the ring-like groove 1b and the cancel claw 8d of the turn signal switch 8 is attachably and detachably arranged at the notched portion 1k. The cancel claw 8d is moved to inside of a locus circle of the cancel cam 5c in contact with the cancel cam 5c by operating to pivot the operating lever 8a in the front and rear direction and by bringing the cancel claw 8d in contact with the cancel cam 5c, the turn signal switch is automatically returned to an original OFF position.

The base 1 is formed with the notched portions 1k respectively for the recesses 1i and 1j which the cancel claws 8d are attached to and detached from such that the base 1 can be used both for an automobile having a right steering wheel and an automobile having a left steering wheel. That is, in the case of an automobile having the right steering wheel, the turn signal switch 8 is used by insertedly attaching to the recess 1i and by operating the operating lever 8a, the cancel claw 1k is attached from the notched portion 1k to inside of the ring-like groove 1b and detached therefrom. In the case of an automobile having the left steering wheel, the turn signal switch 8 is used by insertedly attaching to the recess 1j on the left side and by operating the operating lever 8a, the cancel claw 8d is attached from the notched portion 1k to inside of the ring-like groove 1a and detached therefrom.

Numeral 9 designates a slip sheet formed in a shape of a thin plate ring by oleo-resin having high lubricity. The slip sheet 9 is a lubricating member arranged on an upper face of the stator housing 7 for improving sliding performance of the flat cable 6 mounted on the slip sheet 9. The slip sheet 9 is a flat ring-like member formed with a hole 9a fitted with an inner edge 7d of the stator housing 7 formed to project to an upper face on an inner side thereof at its central portion. The slip sheet 9 is held by fitting to an outer edge 7e an outer peripheral portion of which is formed in an L-like shape of the stator housing 7.

At a portion of a bottom face of the cylinder portion 1a, there is erected a guide 7b for guiding the flat cable 6 coming out from terminals 6a into a containing space A such that the flat cable 6 can be moved smoothly. On an outer side of the guide 7b, there is formed a fitting portion 7f fitted with the terminals 6a connected to an end portion of an outer side of the flat cable 6.

The terminals 6a comprise insulating resin molded substantially in an L-like shape by insert-molding terminals 10 connected to the flat cable 6. The terminals 6a are fitted to the fitting portions 7f and fixed by being sandwiched by the stator housing 7 and the base 1.

The cylinder portion 1a forms the containing space A for containing the flat cable 6 wound in, for example, a spiral shape by the stator housing 7 fixed to the base 1, the rotor housing 4 and the side housing 5 fixed to the rotor housing 4.

The flat cable 6 is constructed by a constitution in a shape of a thin strip respectively installed with terminals 10 and 11 at both ends thereof and insert-molded with a lead wire in a shape of a thin plate by resin having high sliding performance. The flat cable 6 is formed with the terminals 6a at one outer side end portion and terminals 6b at other inner side end portion. The flat cable 6 is formed in the spiral shape, contained in the containing space A via the slip sheet 9 and enclosed in the containing space A by the rotor housing 4.

By fittedly attaching the terminal 6a to the connector portion 7c, the terminal 10 is arranged at the lower face of the base 1. The terminal 6b is installed at the inner side end portion of the flat cable 6 and is arranged at an inner wall portion of the containing space A. The terminal 6b is connected with a harness 12 connected to an air bag apparatus, a horn and the like installed to the steering wheel and the terminal 11 by soldering at inside of a chord cover 4b installed at an upper face of the rotor housing 4.

The rotor housing 4 is constructed by a body of rotation in a shape of a doughnut type case fitting a connector housing 4c formed to project from an upper face thereof to a counter side connector (not illustrated) formed at a lower face of the steering wheel and rotated along with the steering wheel. According to the rotor housing 4, by fitting the connector housing 4c and a projection 4d to the counter side connector and a fitting hole formed at the lower face of the steering wheel, the rotor housing 4 is positioned to the steering wheel.

The rotor housing 4 is fitted with the side housing 5 by engaging elastic locking pieces 5a of the side housing 5 respectively to a plurality of outer peripheral end portions 4e and rotated integrally with the steering wheel.

A body of rotation comprising the rotor housing 4 and the side housing 5, forms an upper half of the containing space A to cover the flat cable 6 from the upper side. The rotor housing 4 is formed with a cylindrical portion 4a for inserting the steering wheel 2 at its center. An inner wall of the cylindrical portion 4a is formed with a claw 4g engaging with an engaging piece 13a formed at the rotor 13 and a projected portion 4h with which a projected piece 13b is brought into contact to thereby connect the rotor housing 4 and the rotor 13 to rotate integrally with each other.

As shown by FIG. 2, the side housing 5 is formed with an inserting groove 5b in a ring-like shape inserted with an outer peripheral wall 4i of the rotor housing 4 at an upper side thereof. The side housing 5 is formed with the cancel cam 5c with which the cancel claw 8d of the turn signal switch 8 is brought into contact for returning the turn signal switch 8 to a neutral position, to project to an outer side at a periphery of a lower end portion thereof inserted to the ring-like groove 1b of the base 1.

Further, the engaging piece 13a of the rotor 13 and the claw 4g of the rotor housing 4 as well as the projected piece 13b of the rotor 13 and the projected portion 4h of the rotor housing 4 are brought into a relationship relative to each other and these may be formed to be opposed to each other. That is, the rotor 13 may be formed with the claw 4 and the projected portion 4h and the rotor housing 4 may be formed with the engaging piece 13a and the projected piece 13b.

The rotor 13 constitutes a portion of the rotary connector apparatus R for rotatably holding the rotor housing 4 to the stator housing 7 and a portion of a detected member of the steering sensor 14 holding the sensor board 14b.

As shown by FIG. 2, the sensor board 14b is fitted or insert-molded to a lower side shaft cylindrical portion 13e at a position downward from the stator housing 7 and the lower side ring-like wall 1e of the base 1. Thereby, an outer diameter of the sensor board 14b can be enlarged-without being interfered by the stator housing 7 and the cylindrical portion 1a of the base 1, a total of the sensor board 14b can be enlarged and accuracy can be promoted by increasing the number of the slits 14c.

The sensor board 14b is perforated with a number of the slits 14c at an entire periphery thereof. The slits 14c are constituted by through holes perforated at equal intervals at a vicinity of the outer peripheral portion of the sensor board 14b in a shape of a circular plate. The slits 14c are pivotably inserted to an interval of the detecting portion 14a of the steering sensor 14.

Figure 4:
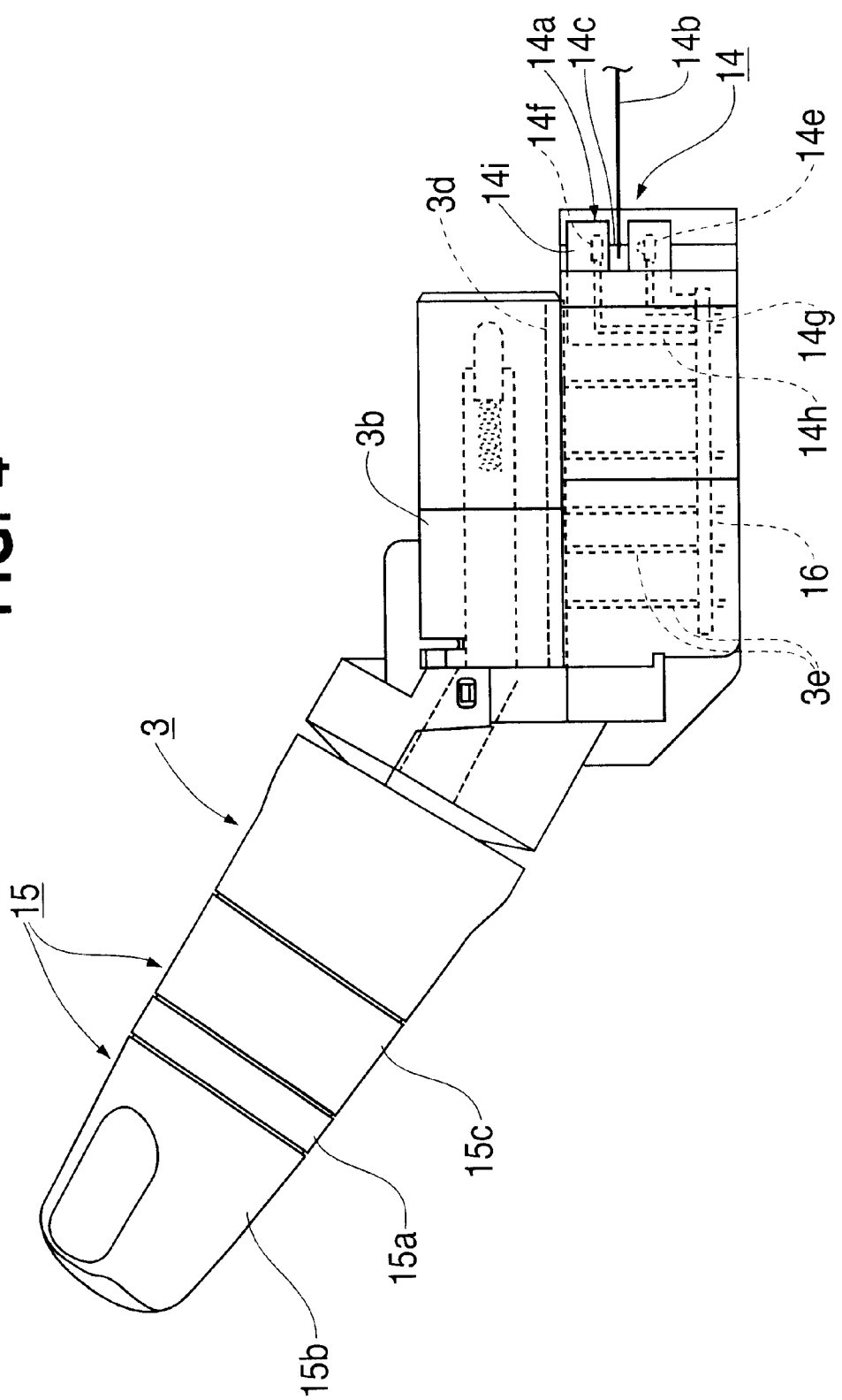
FIG. 4 is a view showing the embodiment of the invention and is a plane view of the wiper washer switch.

The steering sensor 14 is constituted by the sensor board 14b, the detecting portion 14a and the main body 14d. For example, as shown by FIG. 4, the detecting portion 14a is constituted by a light emitting element 14e and a light receiving element 14f for detecting the light from the light emitting element 14e, arranged at upper and lower faces thereof opposed to the slits 14c.

The main body 14d is constituted by the detecting portion 14a, and a board 16 mounted with the light emitting element 14e and the light receiving element 14f constituting the detecting portion 14a and an electric circuit comprising other electronic elements. The main body 14d is installed to the switch body 3b of the wiper washer switch 15 or the switch body 3a of the turn signal switch 8 of the combination switch 3.

The steering sensor 14 detects the steering angle of the steering wheel rotated along with the slits 14c by detecting rotation of the slits 14c arranged between the light emitting element 14e and the light receiving element 14f.

The switch body 3b is provided with a coupler 16b including a terminal 16a for connecting the board 16 and a power source or the like. The switch bodies 3a and 3b are fitted to the base 1 by locking elastic locking pieces 3c shown in FIG. 3 to locking portions (not illustrated) formed at left and right inner walls of the recesses 1i and 1k of the base 1.

The board 16 is mounted with lead terminals 3e conducted to electric parts constituting an electric circuit of the wiper washer switch 15 and to a fixed contact point installed at an electrode plate 3d, the light emitting element 14e and the light receiving element 14f constituting the steering sensor 14 and other electric parts such as resistors and capacitors and commonly uses an electric circuit board of the wiper washer switch 15 and an electric circuit board of the steering sensor 14.

The board 16 is soldered with a lead terminal 14g of the light emitting element 14e and a lead terminal 14h of the light receiving element 14f and mounted with a holding piece 14i for holding the light emitting element 14e, the light receiving element 14f and the lead terminals 14g and 14h. The light emitting element 14e and the light receiving element 14f are positioned by the holding piece 14i.

The steering shaft 2 is pivotably inserted into the steering column, fixedly attached to the steering wheel by inserting through the rotor 13 and is rotated always along with the rotor 13, the rotor housing 4 and the side housing 5.

The embodiment of the invention is constructed by the above-described constitution and a detailed description will be given of operation along with an assembling procedure.

First, the terminal 6b at the one end of the flat cable 6 is insertedly attached to the rotor housing 4 and the harness 12 is soldered to the terminal 6b. The cord cover 4b is attached to the rotor housing 4 to cover the soldered portion by the cord cover 4b. The terminal 6b constituting the inner side end portion of the flat cable 6 is fixed to the rotor housing 4 and the terminal 6b is arranged at an inner side wall of the rotor housing 4.

The rotor housing 4 is pushed into the side housing 5. Then, the elastic locking piece 5a is locked to the outer peripheral end portion 4e, the outer peripheral wall 4i of the rotor housing 4 is fitted to the fitting groove 5b and the rotor housing 4 is fixed to the side housing 5.

Next, the slip sheet 9 is installed above the stator housing 7. Next, the terminal 6a of the other end of the flat cable 6 is fitted to the engaging portion 7f and the terminal 10 is fitted to the connector inserting hole. The base 1 is fixed to the upper side of the stator housing 7 and the terminal 6a is sandwiched by the stator housing 7 and the base 1. Then, the outer side of the flat cable 6 is fixed onto the slip sheet 9 of the stator housing 7. Further, the side housing 5 is inserted into the ring-like groove 1b. Then, the flat cable 6 is contained in the containing space A in the spiral shape.

Next, the upper side shaft cylindrical portion 13c of the rotor 13 having the sensor board 14b, is pushed from the lower side of the base 1 into the cylindrical portion 4a, the engaging portion 13a is engaged with the claw 4g and the projected piece 13b is brought into contact with the projected portion 4h to thereby fix the rotor 13 to the rotor housing 4. Thereby, the rotor 13, the sensor board 14b, the rotor housing 4, the side housing 5, the steering wheel and the steering shaft 2 are rotated integrally.

According to the housing covering the flat cable 6, the lower case is constituted by a fixed body of the base 1 of the combination switch 3 and the stator housing 7 and the upper case is constituted by a body of rotation comprising the rotor housing 4 and the side housing 5.

Next, the switch bodies 3a and 3b of the turn signal switch 8 and the wiper washer switch 15 are fitted to the recesses 1i and 1j of the base 1. Then, the slits 14c of the sensor board 14b are arranged to be inserted between the light emitting element 14e and the light receiving element 14f arranged to be opposed to the holding piece 14i of the switch body 3b.

The base 1 is fixedly attached to the steering column by screwing the screws 17 to the steering column and locking the locking pieces 1c to a bracket of the steering column. The connector 12a and the connector housing 4c are fitted to the counter side connectors on the lower face of the steering wheel, and the steering wheel is fixed to the steering shaft 2 to thereby arrange the rotor housing 4 in a predetermined position.

When the steering wheel is operated to rotate, the rotor housing 4, the side housing 5, the rotor 13, the sensor board 14b and the terminal 6b at the end portion of the flat cable 6 are pivoted along with the steering wheel.

According to the steering angle of the steering wheel, the steering angle of the steering wheel is detected by passing light emitted from the light emitting element 14e to the slit 14c of the sensor board 14b and illuminating the light to the light receiving element 14f and blocking the light therefrom.

Further, when the operating lever 8a is operated to pivot to a left and right direction indicating position, the cancel cam 5c is brought into contact with the cancel claw 8d to thereby return the operating lever 8a to the neutral position.

Further, the sensor board 14b of the above-described steering sensor 14 may be constituted by a reflection plate comprising a member of a metal or the like for reflecting light or a reflecting aluminum foil in a shape of a slit in place of the slit 14c. In this case, a reflection type photo sensor is constituted in place of the light emitting element 14e and the light receiving element 14f, mentioned above. Further, the detecting portion 14a may be constituted by a photo interpreter comprising a light emitting element and a light receiving element or the like.

Further, the sensor board 14b of the above-described steering sensor 14 may be constituted by a magnetic type arranged with a magnet in a shape of slit in place of the slit 14c. In this case, there is constituted a magnetism sensitive element in place of the light emitting element 14e and the light receiving element 14f, mentioned above. Further, there may be constructed a constitution in which in place of the light emitting element 14e and the light receiving element 14f, a magnet and a magnetism sensitive element are arranged to be opposed to each other, a nonmagnetic circular plate having slits is arranged therebetween and a steering angle is detected by interrupting magnetic lines between the magnet and the magnetism sensitive element.

The invention is constituted as explained above and therefore, following effects are achieved.

According to the invention as set forth in the section (1) above, in a combination switch for an automobile mounted to a steering column and having a base formed with recesses on left and right sides thereof, switch bodies mounted to the recesses and a steering sensor for detecting a steering angle of a steering wheel wherein the combination switch includes a rotor rotated along with the steering wheel, the rotor includes a sensor board of the steering sensor, and the switch bodies include a detecting portion for detecting pivotal movement of the sensor board, thereby, the detecting portion is installed at the switch bodies to thereby make the switch bodies serve as a main body of the combination switch and a main body of the steering sensor, a total of the combination switch can be made compact, a number of parts and a number of assembling steps can be reduced and a reduction in cost can be achieved.

According to the invention as set forth in the section (2) above, in the invention as set forth in the section (1), the detecting portion is arranged on a face of the switch bodies on a side of a steering shaft, thereby, the switch bodies are installed to position to predetermined positions of the recesses formed at the base and at the same time, the detecting portion of the steering sensor can be installed at a predetermined position without special positioning operation.

According to the invention as set forth in the section (3) above, in the invention as set forth in the section (1) or (2), the base is mounted with a rotary connector apparatus for electrically connecting the side of the steering wheel and a side of a vehicle body by a flexible flat cable wound in a containing space at inside of a housing formed by a rotor housing and a stator housing wherein the rotor is engaged with the rotor housing via the stator housing from a lower side of the base, an upper side portion of the rotor includes an upper side shaft cylindrical portion engaged with a cylindrical portion formed on an axis core side of the rotor housing, a lower side portion of the rotor includes a lower side shaft cylindrical portion and arranged with the sensor board on a lower side of the stator housing of the lower side shaft cylindrical portion and a central portion of the rotor is formed with a sliding face brought into sliding contact with the stator housing, thereby, the sensor board is not interfered by the stator housing of the rotary connector apparatus or the cylindrical portion of the base, large-sized formation is achieved by prolonging an outer diameter of the sensor board, slits are arranged by a large number, thereby, accuracy of the steering sensor can be promoted.

According to the invention as set forth in the section (4) above, in the invention as set forth in the section (1), (2) or (3), the steering sensor is constituted by electrically connecting the detecting portion to a board included in the switch bodies of the combination switch, thereby, a sensor case for containing the board, a connector connected to the board and the like are dispensed with, a space occupied by the sensor case at a lower face portion of the base and the connector can be reduced, a number of parts and a number of assembling steps can be reduced and a reduction in cost can be achieved. Further, by dispensing with the related art sensor case installed on an outer side of the rotary connector apparatus or an outer side of the base, a total of the combination switch can be downsized.

According to the invention as set forth in the section (5) above, in the invention as set forth in the section (4), the board is mounted with electric parts constituting an electric circuit of the combination switch and parts constituting an electric circuit of the steering sensor, thereby, a number of boards, a number of connectors and a number of operational steps for installing the board can be reduced, a number of parts and a number of assembling steps can be reduced and a reduction in cost can be achieved.

What is claimed is:

1. A combination switch for an automobile mounted to a steering column, comprising a base formed with recesses on left and right sides thereof, switch bodies mounted to the recesses and a steering sensor for detecting a steering angle of a steering wheel, wherein:

the combination switch includes a rotor rotated along with the steering wheel;

the rotor includes a sensor board of the steering sensor; and one of the switch bodies include a detecting portion for detecting pivotal movement of the sensor board.

2. The combination switch according to claim 1, wherein the detecting portion is arranged on a face of said one of the switch bodies on a side of a steering shaft.

3. The combination switch according to claim 1 or 2, wherein:

the base is mounted with a rotary connector apparatus for electrically connecting the side of the steering wheel and a side of a vehicle body by a flexible flat cable wound in a containing space inside of a housing formed by a rotor housing and a stator housing; and the rotor is engaged with the rotor housing via the stator housing from a lower side of the base, and upper side portion of the rotor includes an upper side shaft cylindrical portion formed on an axis core side of the rotor housing, a lower side portion of the rotor includes a lower side shaft cylindrical portion and arranged with the sensor board on a lower side of the stator housing of the lower side shaft cylindrical portion and a central portion of the rotor is formed with a sliding face brought into sliding contact with the stator housing.

4. The combination switch according to any one of claims 1 and 2, wherein the steering sensor is constituted by electrically connecting the detecting portion to a circuit board included in said one of the switch bodies of the combination switch.

5. The combination switch according to claim 4, wherein the circuit board is mounted with electrical parts constituting an electric circuit of the combination switch and parts constituting an electric circuit of the steering sensor.

6. The combination switch according to claim 3, wherein the steering sensor is constituted by electrically connecting the detecting portion to a circuit board included in said one of the switch bodies of the combination switch.

7. The combination switch according to claim 1, wherein said sensor board is a circular plate having an outer peripheral portion provided at equal intervals with means for being detected by said detecting portion upon rotation of said sensor board.

8. The combination switch according to claim 7, wherein said means for being detected comprise a plurality of slits formed in the outer peripheral portion of the circular plate.

9. The combination switch according to claim 7, wherein said means for being detected comprise a plurality of reflection members provided on the outer peripheral portion of the circular plate.

10. The combination switch according to claim 7, wherein said means for being detected comprise a plurality of magnet members provided on the outer peripheral portion of the circular plate.

11. The combination switch according to claim 7, wherein said detecting portion comprises a light emitting element and a light receiving element for detecting light from the light receiving element, said elements being arranged on said one of the switch bodies to face opposing sides of the circular plate.

12. The combination switch according to claim 1, further comprising a cancel cam arranged for rotational movement with said rotor for returning a turn signal switch to a neutral position, said cancel cam being separate from said sensor board.

13. The combination switch according to claim 1, wherein said switch bodies comprise a first switch body which forms part of a turn signal switch and a second switch body which forms part of a wiper washer switch, and wherein said detecting portion is included on one of said first and second switch bodies.

* * * * *